Sept. 16, 1941.     C. MATHIE     2,256,346
ARTIFICIAL FISH LURE
Filed March 24, 1939
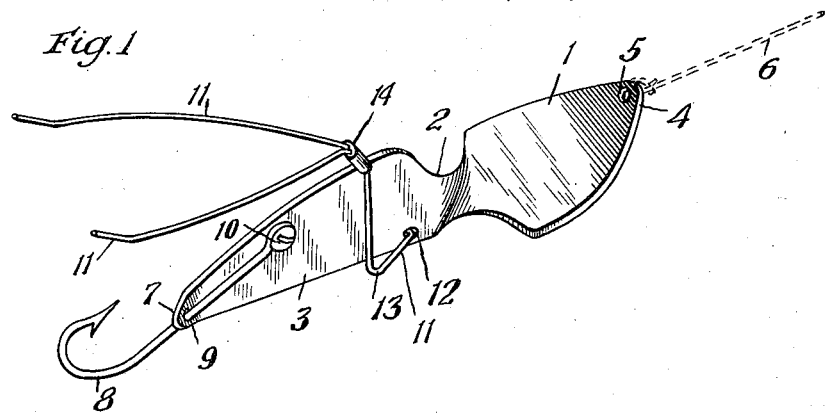
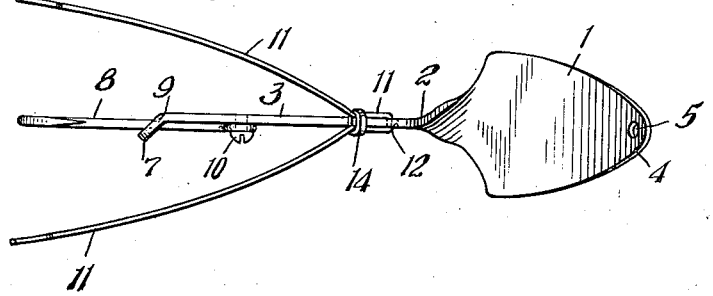
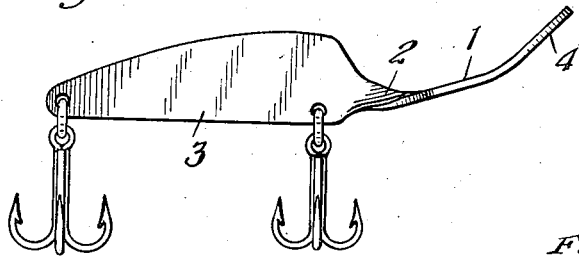
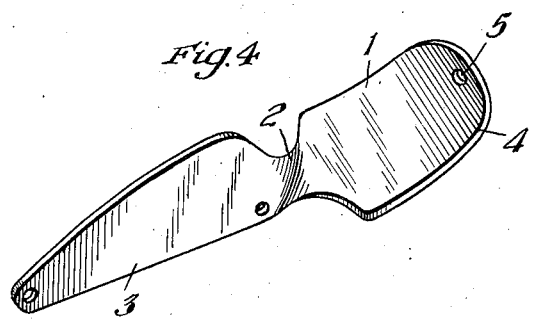
Inventor
Campbell Mathie
By George J. Hight
Atty.

Patented Sept. 16, 1941

2,256,346

UNITED STATES PATENT OFFICE 2,256,346

ARTIFICIAL FISH LURE

Campbell Mathie, Chicago, Ill.

Application March 24, 1939, Serial No. 263,831

7 Claims. (Cl. 43—42)

This invention relates generally to improvements in fishing tackle and pertains particularly to an improved lure.

One object of the invention is to provide a lure economically produced from a single piece of metal, except for the hooks and except for the guard, if any. Another object is to provide a lure, which contrary to the usual lure stamped from metal, will not whirl or rotate when drawn through the water. The product of my invention is in no sense a spoon or spinner and does not function as such. A corollary of this last mentioned object is to provide a lure which will not twist the line, even though no swivel connection be employed.

Another object of my invention is to provide a lure with a unique action when trolled through the water or when retrieved from a cast. The motion of the lure is negatively distinguished by the absence of darts, eccentric rushes, and rotation; and positively distinguished by lateral motion in respect to the axis determined by the point of connection to the line and by a reversing rolling motion about the longitudinal axis of the lure.

Another object is to offset the guard wire to provide means for attachment to the lure of flannel, yarn or other enticement.

Other objects, such as the ease of application of a variety of color, modification of shapes without departing from the principle employed, the facility of making different sizes, and variety in attachment of hooks and guard will become apparent as the lure is further described.

In the accompanying drawing, I have shown a preferred form and two modifications, it being understood that modification of size, of attachment of hooks and guard, and of other details, may be adopted without departure from the scope of my invention.

Figure 1 is a perspective view of the lure in preferred embodiment.

Figure 2 is a top plan view of the preferred embodiment.

Figure 3 is a side elevation showing a modification in the attachment of hooks.

Figure 4 is a perspective view of the lure with a head of modified shape.

Like numerals represent like parts in each figure.

The lure is formed of a flat strip of suitable metal, preferably bright and smooth, or so plated.

After the blank is formed the head plate 1 is bent at the narrow neck portion 2 of the blank to a plane at right angles to the body plate 3. The quarter turn thus given to the head member 1 produces a twisted neck portion 2, as shown in the drawing. The twist serves to make more rigid the narrowed neck portion; and the narrowing of this section gives the illusion, when the lure is in use, of a flexed or jointed bait. I prefer to have the combined length of the head and neck portions approximate the length of the body member 3.

The nose portion 4 of the head plate 1 is tilted or curved from the horizontal in the fashion of a sled runner. This aids the lure in maintaining a proper travel depth and assists in guiding the lure over obstructions in the water. It is not necessary that the nose portion 4 be relatively pointed. The blunt-shaped nose 4 of Figure 4 is equally effective. The centered hole 5 at the top of the nose 4 serves as a means for the attachment of the line 6. A swivel in the line connection is unnecessary.

The body portion 3 is so shaped that its greater mass is above the central horizontal longitudinal axis of the lure. The combination of the relatively broad plate members 1 and 3 in planes at right angles to each other prevents rotation of the lure in travel.

The extreme or tail end of the body plate 3 is offset at 7 to serve as a support for the shank of the hook 8 in the preefrred design, the barb of the hook being passed through a hole 9 provided in said offset. The hook may be secured to plate 3 by screw 10 as shown in Figure 1. The number of hooks and the manner of their attachment may be modified, however, as suggested in Figures 3 and 4.

If desired, the lure may be provided with a guard. I prefer one which is movable, within limits, to and from the hook, but which is held in place by gravity. I have found it best in attaching a guard to provide a pivot hole 12 near the bottom of plate 3 close to the neck 2. The guard wire 11 is placed through this hole and on either side of the lure is supported by the broad surface of plate 3. The clip 14 placed around the guard wires, adds rigidity to the guard wire; and as the bait is drawn through the water rests loosely on the top edge of plate 3 to maintain the guard in position above the hook. The guard wire is offset at 13 as a stiffening means and to provide an angle at the offset and between the guard wire and the body of the lure where colored yarn, flannel or other enticement may be threaded and secured.

The travel of the lure is unique. The relative position of the plane surfaces of plates 1 and 3, together with the twisted neck portion 2 gives the characteristic action. Viewed from above, plate 1 is seen to oscillate back and forth in a reversing rolling motion, but never completely revolving in either direction. Viewed from the top side, plate 3 is seen to have a lateral movement in relation to point 5, such movement being most extreme at the rearward end of the lure. There is present also an apparent flexibility at the neck portion. The combined rolling motion about the longitudinal axis of the lure and the lateral shifting of this axis in relation to the line of travel very closely simulate the motions of a fish in search of food.

A lure which can be cast or trolled without twisting the line is of importance to the angler. Once a line becomes twisted its usefulness in casting is at an end. The use of the lure of this invention obviates the necessity of employing any means for untwisting the line when casting or trolling, because the reversing rolling motion of the lure prevents twisting of the line in any degree. It is unnecessary to use a swivel in the line or between the line and lure.

It is understood that changes which fall within the scope of the claims may be made in the embodiments of my invention as herein described.

I claim:

1. A fish lure comprising a pair of relatively broad plates substantially in planes at a right angle to each other and connected by a narrow twisted neck portion having substantially a quarter-turn therein, with means for hook attachment in one plate and means for line attachment in the other plate.

2. A fish lure having a relatively broad but thin body plate disposed at one angle, a relatively broad but thin head plate disposed along the longitudinal axis of the lure at substantially a right angle to the body plate and connected thereto by a twisted neck portion with means for hook and line attachment.

3. A fish lure having a plate-like body portion disposed at a right angle to a plate-like head portion, means for attaching hooks to the body portion, means for attaching a line to the head portion, and a guard pivoted in the body portion with the guard wire offset beyond one margin of the body portion to provide an angle wherein additional lure may be secured.

4. A fish lure of broad but thin body and head members at right angles to each other along a common axis, means for attaching hooks in one or more places to the body portion and a line to the head portion, and a narrowed and twisted neck portion connecting the body and head portions, the lure being characterized by a reversing rolling motion when drawn through the water.

5. A non-revolving fish lure comprised of relatively broad head and body plates disposed at right angles to each other along the same axis and connected by a narrow neck portion having substantially a quarter-turn therein, with means for attaching a hook in one plate and a line in the other plate.

6. A non-rotating fish lure adapted to be drawn through the water by a line attached thereto, including a relatively broad flat plate disposed in a horizontal plane with its longitudinal axis substantially parallel with the line of travel of the lure, a second relatively broad flat plate rearwardly of and rigidly connected by a narrow neck portion to the other plate, and disposed in a vertical plane, with its longitudinal axis in substantial alinement with the axis of the other plate, and means on said forward plate for attachment to a line, and on said rearward plate for attachment of a hook.

7. A fish lure having a relatively broad vertical body portion for hook attachment and a horizontal head portion upwardly curved at its extremity for line attachment, the body and head portions being disposed longitudinally to the horizontal axis of the lure with a part of the body portion lying above said axis.

CAMPBELL MATHIE.